(12) United States Patent
Zielezinski et al.

(10) Patent No.: US 9,969,327 B2
(45) Date of Patent: May 15, 2018

(54) VEHICLE IMPROPER LOAD SENSOR

(71) Applicant: Auto Truck Group, LLC, Bartlett, IL (US)

(72) Inventors: Kevin Zielezinski, Manhattan, IL (US); Bryan Schieler, Palatine, IL (US)

( * ) Notice: Subject to any disclaimer, the term of this patent is extended or adjusted under 35 U.S.C. 154(b) by 39 days.

(21) Appl. No.: 15/060,197

(22) Filed: Mar. 3, 2016

(65) Prior Publication Data

US 2016/0257250 A1 Sep. 8, 2016

Related U.S. Application Data (60) Provisional application No. 62/128,143, filed on Mar. 4, 2015.

(51) Int. Cl.
*B60Q 9/00* (2006.01)
*B60K 28/08* (2006.01)

(52) U.S. Cl.
CPC ............... *B60Q 9/00* (2013.01); *B60K 28/08* (2013.01)

(58) Field of Classification Search
CPC .................................. B60Q 9/00; B60K 28/08
USPC ........................................ 340/440, 665, 438
See application file for complete search history.

(56) References Cited

U.S. PATENT DOCUMENTS

| | | |
|---|---|---|
| 2,769,967 A | 11/1956 | Lukocevich |
| 2,779,013 A | 1/1957 | Chotro |
| 2,842,633 A | 7/1958 | Roach |
| 3,531,766 A | 9/1970 | Henzel |
| 3,718,792 A | 2/1973 | Stagner |
| 3,891,964 A | 6/1975 | Geiger |
| 5,099,221 A | 3/1992 | Sandkuhler |
| 5,243,146 A | 9/1993 | Nishitani |
| 5,522,468 A * | 6/1996 | Dohrmann ............. G01G 19/08 177/136 |
| 5,844,474 A * | 12/1998 | Saling ................. B60R 16/0232 177/137 |
| 5,880,409 A | 3/1999 | Hartman |
| 5,902,966 A | 5/1999 | VonMuenster |
| 6,025,563 A | 2/2000 | Lesesky et al. |
| 6,259,041 B1 | 7/2001 | Dohrmann |
| 6,323,441 B1 | 11/2001 | Hager |
| 6,363,906 B1 | 4/2002 | Thompson et al. |
| 6,378,276 B1 | 4/2002 | Dorge et al. |
| 6,921,100 B2 * | 7/2005 | Mantini ............... B60G 17/005 177/137 |
| 7,017,699 B2 | 3/2006 | Becker et al. |
| 7,112,023 B1 | 9/2006 | Tardif |
| 7,113,081 B1 | 9/2006 | Reichow et al. |
| 7,141,746 B1 | 11/2006 | Scott |
| 7,561,034 B2 | 7/2009 | Reichow et al. |
| 2001/0009206 A1 | 7/2001 | Lines |

(Continued)

FOREIGN PATENT DOCUMENTS

FR 2968076 7/2013

*Primary Examiner* — Jack K Wang (57) ABSTRACT

A vehicle load warning apparatus utilizing inductive proximity sensors to signal an alarm to an operator when a vehicle achieves a maximum weight. The vehicle load warning apparatus can also provide an intermediate warning to an operator when the vehicle approaches the maximum weight. The vehicle load warning apparatus can also utilize inductive proximity sensors at each end of both axles of a vehicle and provide imbalance warning signals if the weight on a vehicle is not equally distributed throughout the body of the vehicle.

42 Claims, 7 Drawing Sheets

(56) References Cited

U.S. PATENT DOCUMENTS

| | | |
|---|---|---|
| 2004/0032323 A1 | 2/2004 | Nommensen |
| 2004/0262995 A1 | 12/2004 | Hawkins |
| 2013/0024152 A1 | 1/2013 | Hofmann et al. |
| 2015/0266375 A1* | 9/2015 | Tavvala ................ B60K 17/36 180/24.02 |

* cited by examiner

VEHICLE IMPROPER LOAD SENSOR

CROSS REFERENCE TO RELATED APPLICATION(S)

This application claims the benefit of U.S. Provisional Application No. 62/128,143, filed Mar. 4, 2014.

FIELD OF THE INVENTION

The present invention relates in general to a weight detection apparatus for a load-carrying vehicle. More particularly, the present invention relates to an electronic sensor that triggers when a vehicle's load reaches at least one predetermined weight.

BACKGROUND OF THE INVENTION

Frequently, vehicles, including trucks designed to carry a payload, have a maximum load rating for safe operation. Typically, a vehicle can be equipped with an overload sensor that is operatively linked to the vehicle's horn so that the horn will sound if the vehicle's payload exceeds a maximum rating. In other instances, a vehicle can be loaded unevenly, thereby causing difficulties with operating the vehicle if too much weight is on one side of the vehicle relative to the opposite side. In still other instances, a vehicle may begin to reach an overloaded capacity, yet a vehicle operator may have no clear indication that an overloaded state would soon be reached as weight continues to be added onto the vehicle. It can be beneficial for an operator to know that an overloaded state is about to be met before it actually is met so that any necessary preventative steps can be taken.

A need, therefore, exists in the art for one or more sensors that can indicate, in one embodiment, when a payload in a vehicle reaches the maximum safe load weight and, in another embodiment, when a load weight is unbalanced in a vehicle and, in another embodiment, when the load weight approaches the maximum load safe load weight before such load weight is met, and in yet another embodiment, the then present range of payload of the vehicle.

SUMMARY OF THE INVENTION

According to the present invention, the foregoing and other objects and advantages are obtained by a proximity sensor mounted to the body of a vehicle having a member attached at a first end to an axle housing of the vehicle in a vertical position below the sensor. A second end of the member is disposed with respect to the sensor (i) horizontally, so as to be disposed directly under the sensor; (ii) offset in a direction from front to back of the vehicle, so as to provide a clearance distance that is less than the distance of the nominal range of the sensor between the sensor and the member in the case in which said sensor moves downward as said vehicle is loaded; and (iii) vertically, in a position such that in the case in which the vehicle approaches becoming overloaded, with the result that in the case in which the sensor deflects downward until the member has become vertically aligned with the sensor whereby the clearance distance between the sensor is within the nominal range of the sensor, thereby triggering the sensor, yet such clearance distance being great enough so as to avoid contact between the sensor and the member.

According to another embodiment of the instant invention, the mounting of the sensor to the body comprises a first plate to which the sensor is mounted at its first end and a second plate having a first end to which the second end of the first plate is mounted and having a second end mounted to the vehicle body whereby the mounting of the second end of the first plate to the first end of the second plate is adjustable.

According to another aspect of the invention, the vehicle load warning apparatus further comprises an electrical signal being sent from the sensor in the case in which the sensor is within the nominal range of the member wherein the signal is electrically connected via a switch to an alarm audible to the operator of the vehicle. According to another aspect of the invention, the vehicle load warning apparatus switch is in an open position, unless the vehicle is in a parked gear.

According to another aspect of the invention, the vehicle load warning apparatus sensor is triggered only in the case in which the sensor remains within the nominal range of the member for at least one second.

According to another aspect of the invention, the vehicle load warning apparatus proximity sensor is an inductive proximity sensor.

According to another aspect of the invention the vehicle load warning apparatus member is metal.

According to another aspect of the invention the vehicle load warning apparatus metal member is a bracket.

According to another embodiment of the invention, there is a vehicle load warning apparatus comprising an inductive proximity sensor mounted to a first plate at a first end. The first plate has a second end mounted to a first end of a second pate. The second plate has a second end mounted to a vehicle body. A bracket is attached at a first end to the axle housing on the vehicle. A second end of the bracket is disposed in a position such that when a vehicle is loaded to a maximum weight, the inductive proximity sensor deflects with the vehicle body until the second end of the bracket is vertically aligned in front of the sensing component of the inductive proximity sensor, whereby the distance between the sensing component of the inductive proximity sensor is within a nominal range to detect the second end of the bracket, yet not so close as to permit contact between the inductive proximity sensor and the second end of the bracket.

According to another aspect of the invention, the vehicle load warning apparatus's second end of the first plate and the first end of the second plate are adjustably mounted to one another. According to another aspect of the invention, the vehicle load warning apparatus further comprises a signal sent from the inductive proximity sensor when the inductive proximity sensor is within the nominal range of the second end of the bracket wherein the signal triggers an alarm. According to another aspect of the invention, the vehicle load warning apparatus's alarm is triggered only in the case in which the vehicle is in a parked gear. According to another aspect of the invention, the vehicle load warning apparatus's alarm is triggered only in the case in which the inductive proximity sensor remains within a nominal range of the second end of the bracket for at least one second.

According to another embodiment of the instant invention, there exists a vehicle load warning apparatus comprising a first proximity sensor mounted to the body of the vehicle. A second proximity sensor is mounted to the body at a position above the first sensor. A member is attached at a first end to the axle housing on the vehicle in a vertical position below the first sensor. A second end of the member is disposed with respect to the first sensor (i) horizontally, so as to be disposed directly under the first sensor; (ii) offset in a direction from front to back of the vehicle, so as to provide clearance between the first sensor and the second sensor in the case in which the sensors move downward as the vehicle is loaded; and (iii) vertically, in a position such that in the case in which the vehicle is loaded to a maximum weight, the first sensor and the second sensor deflect with the body until the second end of the member has become vertically aligned, first, with the first sensor whereby the clearance distance between the first sensor and the member is within the nominal range of the first sensor thereby triggering the first sensor, while the clearance distance being great enough so as not to permit contact between the first sensor and the member, and second, with the second sensor whereby the clearance distance between the second sensor and the member is within the nominal range of the second sensor thereby triggering the second sensor, while the clearance distance being great enough so as not to permit contact between the second sensor and the member.

According to another aspect of the invention, the vehicle load warning apparatus's sensors are adjustably mounted to the body. According to another aspect of the invention, the vehicle load warning apparatus of further comprises a first electrical signal being sent from the first sensor in the case in which the first sensor is within the nominal range of the member wherein the first signal is electrically connected via a switch to an alarm audible to the operator of the vehicle and a second electrical signal being sent from the second sensor in the case in which the second sensor is within the nominal range of the member wherein the second signal is electrically connected via a switch to an alarm audible to the operator of the vehicle. According to another aspect of the invention, the vehicle load warning apparatus's switch is in an open position unless the vehicle is in a parked gear. According to another aspect of the invention, the vehicle load warning apparatus's first sensor is triggered only in the case in which the sensor remains within the nominal range of the member for at least one second and wherein the second sensor is triggered only in the case in which the sensor remains within the nominal range of the member for at least one second. According to another aspect of the invention, each of the vehicle load warning apparatus's proximity sensors are an inductive proximity sensor. According to another aspect of the invention, the vehicle load warning apparatus's member is metal. According to another aspect of the invention, the vehicle load warning apparatus's metal member is a bracket.

According to another embodiment of the invention, there exists a vehicle load warning apparatus comprising a first proximity sensor mounted to the rear driver side of the body of the vehicle. A driver side member is attached at a first end to the driver side rear axle housing of the vehicle. A second proximity sensor is mounted to the rear passenger side of the body of the vehicle. A passenger side member is attached at a first end to the passenger side rear axle housing of the vehicle. A second end of the driver side member and a second end of the passenger side member is disposed horizontally equidistant from the ground on which the vehicle rests, such that, first, in the case in which the vehicle becomes overloaded in an unbalanced manner such that the center of gravity of the load deflects toward the driver side of the vehicle, the first sensor moves downward so as to be no longer horizontally equidistant from the ground with the second sensor with the result that the driver side member becomes vertically aligned with and within the nominal range of the first sensor without contact between the first sensor and the driver side member, thereby triggering the first sensor, and, second, in the case in which the vehicle becomes overloaded in an unbalanced manner such that the center of gravity of the load deflects toward the passenger side of the vehicle, the second sensor moves downward so as to be no longer horizontally equidistant from the ground with the first sensor with the result that the passenger side member becomes vertically aligned with and within the nominal range of the second sensor without contact between the second sensor and the passenger side member, thereby triggering the second sensor.

According to another aspect of the invention, the vehicle load warning apparatus further comprises an electrical signal being sent from the first sensor in the case in which the sensor is within the nominal range of the driver side member wherein the signal is electrically connected via a first switch to a first alarm audible to the operator of the vehicle indicating overload unbalanced toward driver side of the vehicle and an electrical signal being sent from the second sensor in the case in which the sensor is within the nominal range of the passenger side member wherein the signal is electrically connected via a second switch to a second alarm audible to the operator of the vehicle indicating overload unbalanced toward passenger side of the vehicle.

According to another aspect of the invention, the vehicle load warning apparatus's first switch and the second switch are in an open position, unless the vehicle is in a parked gear. According to another aspect of the invention, the vehicle load warning apparatus's first sensor is triggered only in the case in which the sensor remains within the nominal range of the driver side member for at least one second and the second sensor is triggered only in the case in which the sensor remains within the nominal range of the passenger side member for at least one second. According to another aspect of the invention, each of the sensors is an inductive proximity sensor. According to another aspect of the invention, each of the driver side member and the passenger side member is metal. According to another aspect of the invention, each of the metal members are a bracket.

According to another embodiment of the invention, the vehicle overload warning apparatus uses a proximity sensor mounted to the body of the said vehicle in a horizontal position relative to the axle housing of said vehicle and a member attached to said axle housing in a horizontal position relative to and directly below said sensor so that, in the case in which said vehicle approaches becoming overloaded said sensor deflects downward with the result that the distance between said sensor and said member is within the nominal range of said sensor, thereby triggering said sensor and uses additionally a bump stop attached to said body of said vehicle having a width great enough so as to contact said axle housing in the case in which said body and said sensor deflect downward to avoid contact between said sensor and said member.

According to another embodiment of the invention, there is disclosed a vehicle load warning apparatus and range of payload indicator system based on the combination of a first proximity sensor mounted to the body of said vehicle and a second proximity sensor mounted to said body at a position above said first sensor, and a member attached at a first end to the axle housing on the said vehicle in a vertical position below said first sensor with the second end of said member being disposed with respect to said first sensor (i) horizontally, so as to be disposed directly under said first sensor; (ii) offset in a direction from front to back of said vehicle, so as to provide clearance between said first sensor and said second sensor in the case in which said sensors move downward as the vehicle is loaded; and (iii) vertically, in a position such that in the case in which said vehicle is loaded to a maximum weight, said first sensor and said second sensor deflect with said body until said second end of said member has become vertically aligned, first, with said first sensor whereby said clearance distance between said first sensor and said member is within the nominal range of said first sensor thereby triggering said first sensor, said clearance distance being great enough so as not to permit contact between said first sensor and said member, and second, with said second sensor whereby said clearance distance between said second sensor and said member is within the nominal range of said second sensor thereby triggering said second sensor, said clearance distance being great enough so as not to permit contact between said second sensor and said member whereby a predetermined first payload range is indicated to the operator of said vehicle in the case in which said first sensor has been triggered but said second sensor has not been triggered, and whereby a predetermined second payload range that is greater than said first payload range is indicated to the operator of said vehicle in the case in which said second sensor has been triggered. It will be apparent that such a vehicle load warning apparatus and range of payload indicator system can be constructed with more than two sensor, to wit, using a multiplicity of proximity sensors mounted directly one above the other to the body of said vehicle, and a member attached at a first end to the axle housing on the said vehicle in a vertical position below the lowest mounted of said multiplicity of sensors with the second end of said member being disposed with respect to said multiplicity of sensors (i) horizontally, so as to be disposed directly under said lowest mounted sensor; (ii) offset in a direction from front to back of said vehicle, so as to provide clearance between each of said sensors in the case in which said sensors move downward as the vehicle is loaded; and (iii) vertically, in a position such that in the case in which said vehicle is loaded said sensors deflect with said body until said second end of said member has become vertically aligned, first, with said lowest mounted sensor whereby said clearance distance between said first sensor and said member is within the nominal range of said first sensor thereby triggering said first sensor, said clearance distance being great enough so as not to permit contact between said first sensor and said member, and thereafter with each of said sensors in turn, whereby said clearance distance between each of said sensors and said member is within the nominal range of said sensor thereby triggering said sensor, said clearance distance being great enough so as not to permit contact between any of said sensors and said member whereby a predetermined first payload range is indicated to the operator of said vehicle in the case in which said lowest mounted sensor has been triggered but said second sensor has not been triggered, and in turn whereby predetermined payload ranges that are greater than said first payload range are in turn indicated to the operator of said vehicle in the case in which each of said sensors in turn has been triggered.

As one skilled in the art can readily appreciate, there are many and varied ways in which the operator of the vehicle can be apprised of the different loading situations described in the various embodiments disclosed herein. For example, in addition to employing an alarm that is electrically sounded by the triggering of a sensor in an overload situation, one can use in addition to or in place of such an audible signal a signal light, which might remain lit until such overload situation has been ameliorated. Additionally, different sounds for alarms, or number of signal lights lit, can be used to signify coming close to overload as opposed to overloaded, or for each payload range entered in the embodiment having that availability. Finally, the electronic signals emanating in the case in which a proximity sensor is triggered can be used to drive digital or analog meters or gauges visible to the operator, for example, mounted on or included in the dashboard of said vehicle.

Other features and advantages of the instant invention will be apparent to those skilled in the art from their application of ordinary skill to the description and drawings contained herein.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
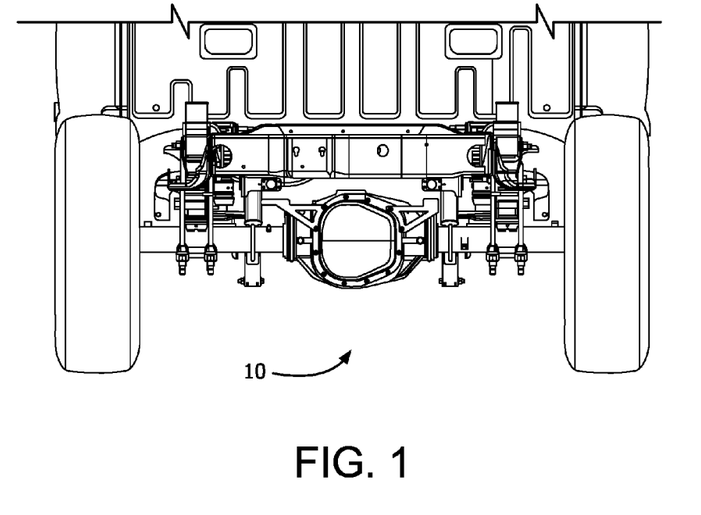
FIG. 1 is a rear side elevational view according to a first embodiment of the invention without a load on a vehicle.
Figure 2:
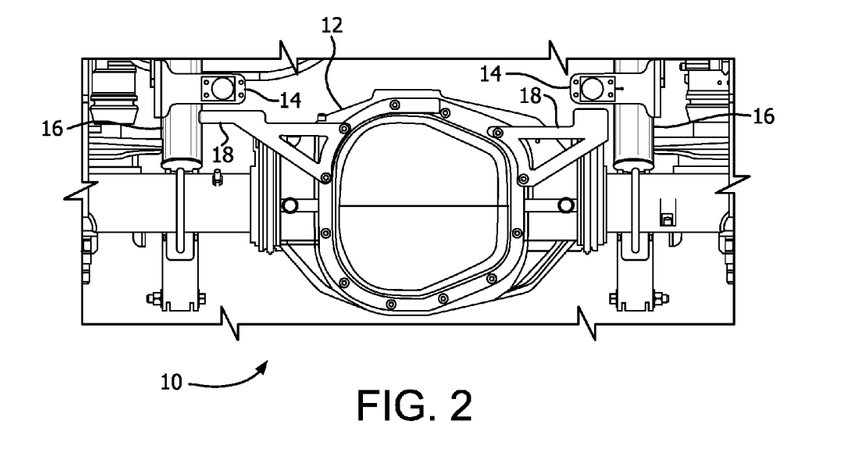
FIG. 2 is a rear side elevational view according to said first embodiment of the invention without a load on a vehicle.

FIG. 1 depicts a vehicle overload sensor according to a first embodiment of the instant invention, generally identified as numeral 10. A zoomed in image of the vehicle overload sensor is depicted in FIG. 2. The vehicle overload sensor 10 comprises a pair of proximity sensors 14 attached to a vehicle body 16 at opposing ends of an axle on vehicle body 16. The vehicle overload sensor 10 further comprises a pair of brackets 18 attached to opposing sides of axle housing 12. In a preferred embodiment, the overload sensor 10 is located on the rear axle on a vehicle. In other embodiments, the overload sensor 10 is used on multiple axles.

Figure 5:
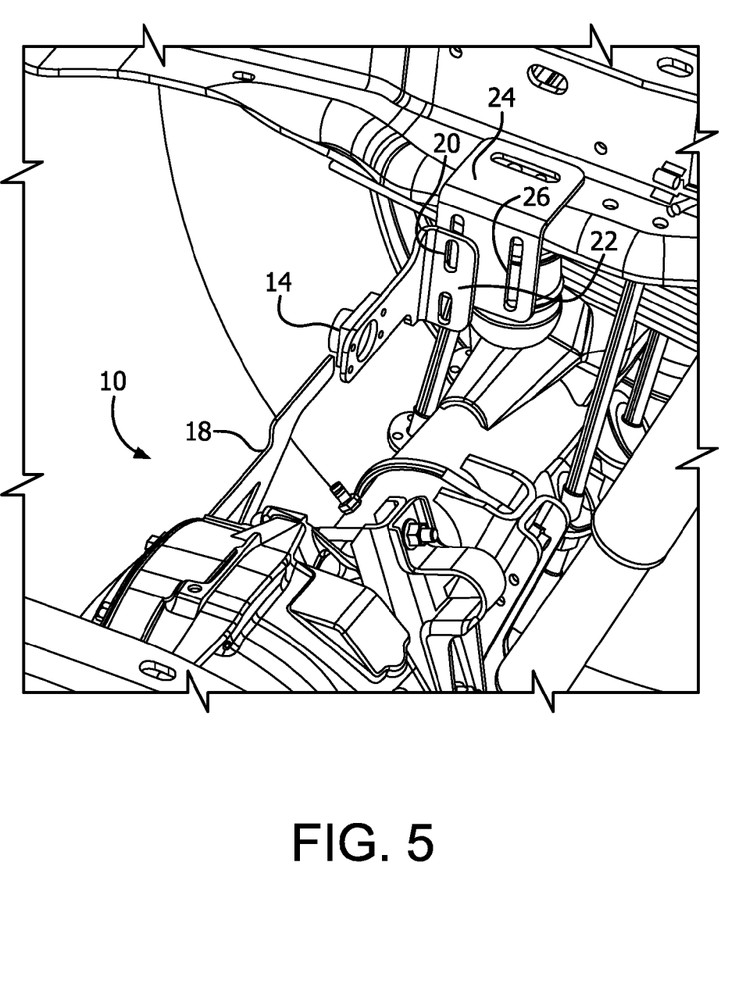
FIG. 5 is a perspective view according to one embodiment of the invention without a load on a vehicle.

Proximity sensors 14 utilize inductive proximity to indicate when a vehicle's suspension has moved the distance known to correlate to the maximum weight for a particular vehicle. As weight is added to a vehicle, the suspension deflects and proximity sensors 14 move closer to brackets 18. The distance between proximity sensors 14 and brackets 18 can be calibrated when a known maximum cargo weight is loaded on the vehicle. Turning to FIG. 5, one proximity sensor 14 is depicted. Proximity sensor 14 is adjustably affixed to the vehicle body 16 by means known to those having ordinary skill in the art. As shown in FIG. 5, proximity sensor 14 has a plate 22 mated to a second plate 24. Second plate 24 is secured to vehicle body 12. Slots 20 are found in both plate 22 and second plate 24. Bolts (not depicted) can be slid in slot 20 to affix plate 22 to second plate 24. In this manner, the vertical position of plate 22 relative to second plate 24 can be adjusted. A second slot 26 is depicted on second plate 24. In this manner, plate 22 can be adjusted horizontally relative to second plate 24.

Figure 3:
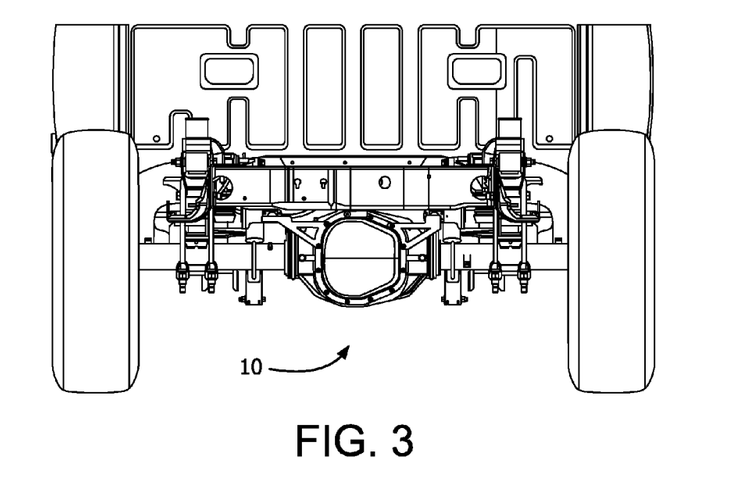
FIG. 3 is a rear side elevational view according to said first embodiment of the invention with a load on a vehicle.
Figure 4:
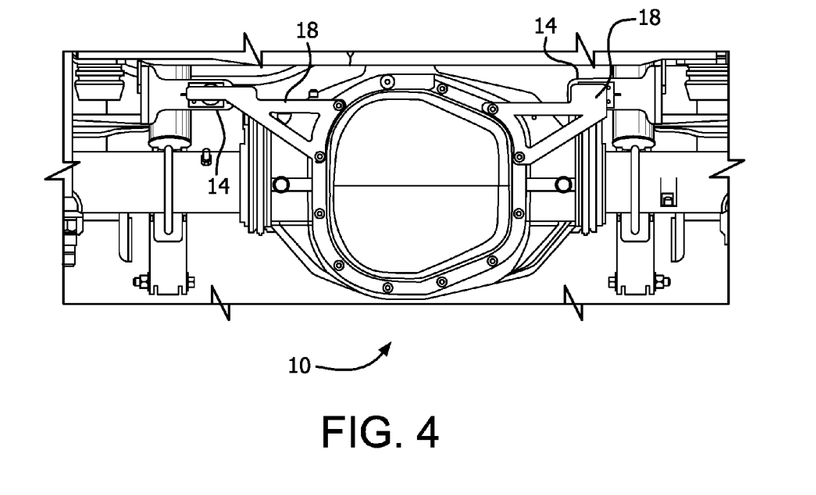
FIG. 4 is a zoomed in rear side elevational view according to said first embodiment of the invention with a load on a vehicle.

Turning to FIG. 3, overload sensor 10 is depicted in a load bearing operational state. A zoomed in view of FIG. 3 is shown in FIG. 4. In FIG. 4, the vehicle's suspension has deflected as the maximum cargo weight has been added to the vehicle. In this operational state, proximity sensors 14 have moved with the vehicle's suspension and each of the proximity sensors 14 are now covered by each of the brackets 18. The distance between proximity sensors 14 and brackets 18 is close enough to activate each of the proximity sensors 14, yet still far enough away from brackets 18 to avoid physical contact between proximity sensors 14 and brackets 18. This distance is sometimes referred to as an operative range or a nominal range.

Figure 6:
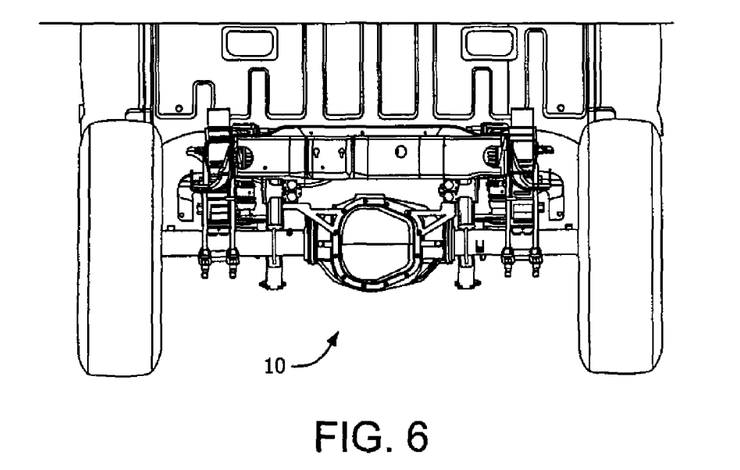
FIG. 6 is a rear side elevational view according to a second embodiment of the invention without a load on a vehicle.
Figure 7:
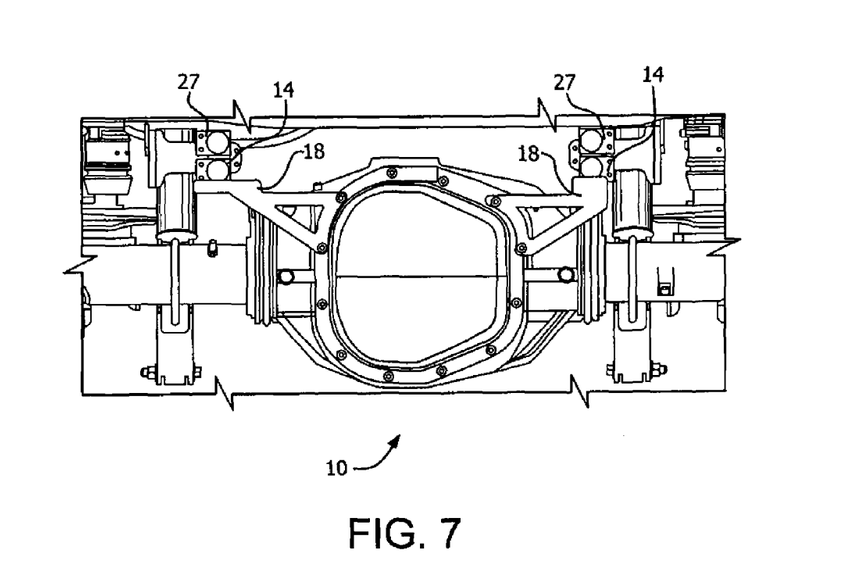
FIG. 7 is a zoomed in rear side elevational view according to said second embodiment of the invention without a load on a vehicle.
Figure 8:
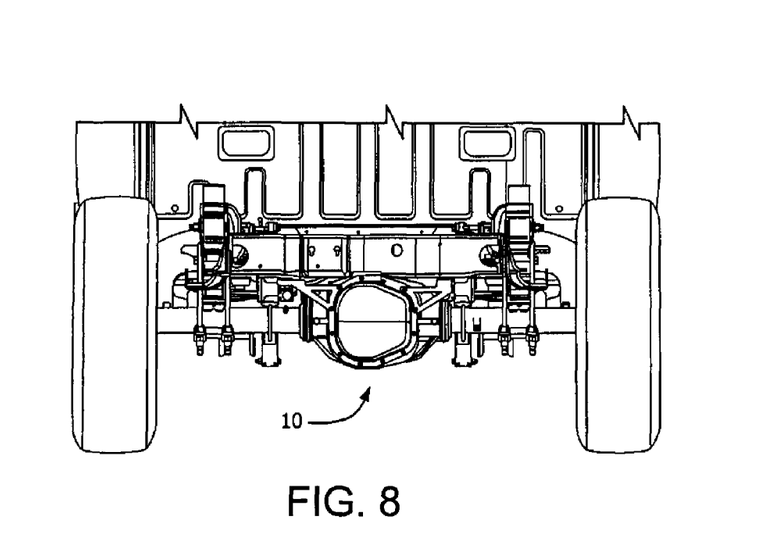
FIG. 8 is a rear side elevational view according to said second embodiment of the invention with a load on a vehicle.
Figure 9:
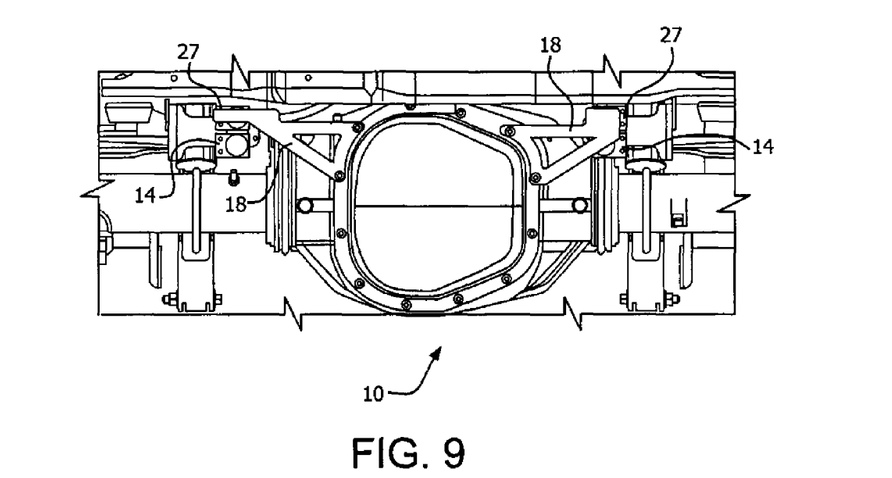
FIG. 9 is a zoomed in rear side elevational view according to said second embodiment of the invention with a load on a vehicle.

A second embodiment of the instant invention is depicted on FIG. 6. FIG. 6 depicts a vehicle without a cargo load. FIG. 7 is a zoomed in image of FIG. 6. In FIG. 7, the vehicle overload sensor now comprises a first set of proximity sensors 14 and a second set of proximity sensors 27. In other embodiments (not depicted) a plurality of additional pairs of proximity sensors can be added in a horizontal relationship to the existing proximity sensors. In this second embodiment of the instant invention, as the cargo weight increases toward an overloaded operational state, the first set of proximity sensors 14 are activated as the suspension deflects and the first set of proximity sensors 14 come into alignment with brackets 18 in the manner previously described herein. At this intermediate state, a proximity sensor warning alerts the operator that the vehicle load is approximating the overload state. If additional cargo weight is added to the vehicle, the second set of proximity sensors 27 come into alignment with brackets 18 in the manner previously described herein as the suspension continues to deflect and the cargo weight achieves an overloaded operational state. Such an overloaded functional state is depicted in FIG. 8 and FIG. 9.

With respect to each embodiment of the instant invention, when either proximity sensors 14 or, if applicable, second set of proximity sensors 27 come into alignment with brackets 18, a signal may, according to a preferred embodiment, trigger the vehicle's horn to sound as to warn a user that the weight of the cargo equals or exceeds a predetermined value. In another embodiment of the instant invention, a separate horn or other alarm may be used in place of the vehicle's horn. As an advantage of systems using contact switches to achieve the same ends, sensor 10 is inexpensive, durable and readily available.

Figure 10:
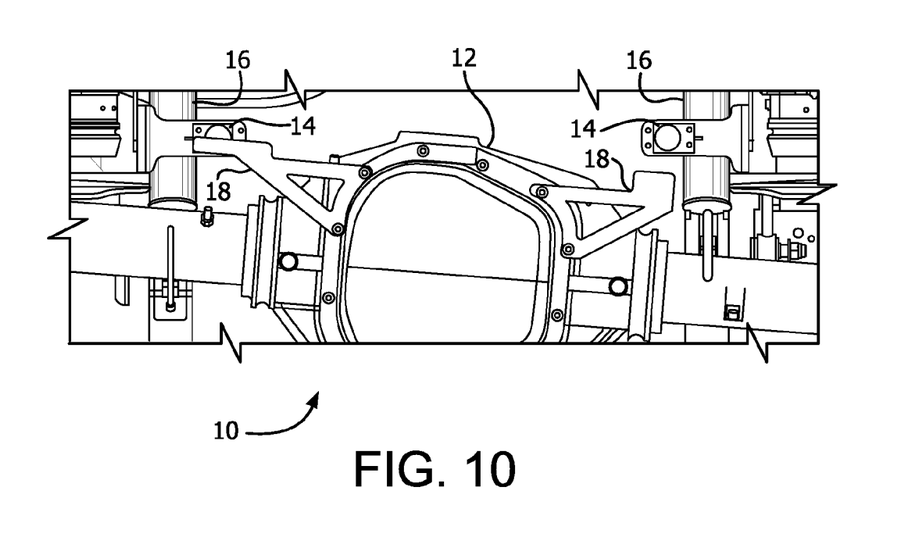
FIG. 10 is a rear side elevational view according to a third embodiment of the invention with a load on a vehicle.

Additionally, according to another embodiment of the instant invention depicted on FIG. 10, if the cargo in a vehicle is disproportionately loaded on either the right or the left side of the vehicle, it is possible that the weight of the cargo would be in excess of a pre-established weight maximum relative to the other side of the vehicle. In such a circumstance, a separate signal is sent by sensor 10 in order to alert a user to the differential balance. In another embodiment of the instant invention, the disproportionate load alarm will be identical to the alarm sounded when the maximum cargo load is achieved. In another embodiment, sensor 10 sends a signal to a cabin-mounted display that alerts a drive to configurations indicating disproportionately loaded cargo and, separately, a maximum cargo load weight and, optionally, an intermediate cargo weight.

Figure 11:
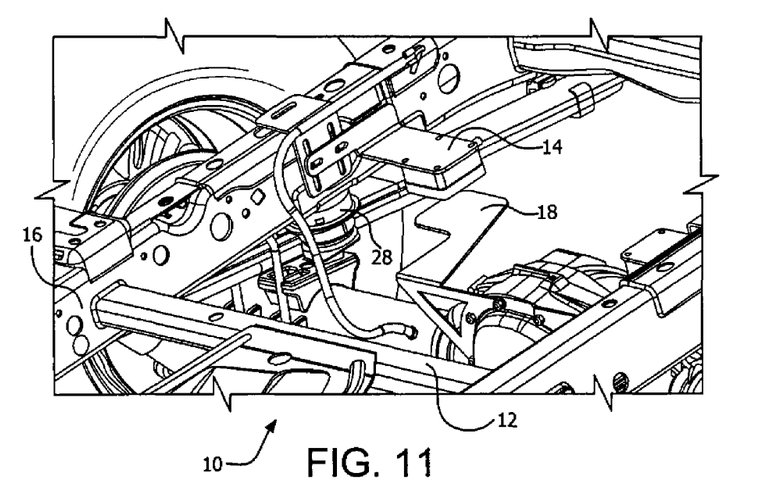
FIG. 11 is a perspective view according to a fourth embodiment of the invention without a load on a vehicle.

As well, according to another embodiment of the instant invention depicted in FIG. 11, in one side of a vehicle overload sensor apparatus 10 a proximity sensor 14 mounted on body 16 of the vehicle is disposed in a position that is horizontal with respect to axle housing 12. As the payload of the vehicle increases, horizontally disposed sensor 14 deflects downward toward similarly horizontally disposed member 18. At the time that member 18 is within the nominal range of sensor 18, sensor 18 is triggered indicating an overload situation to the operator; however, to insure that sensor 14 cannot come into contact with member 18 so as to be damaged, a bump stop 28 is shown mounted to the bottommost member of vehicle body 16, having a width that in contacting axle housing 12 prevents contact between sensor 14 and member 18. One skilled in the art can easily implement this apparatus on each side of the vehicle, preventing damage to sensors 14 mounted on each side of that body 16 of such a vehicle.

Figure 12:
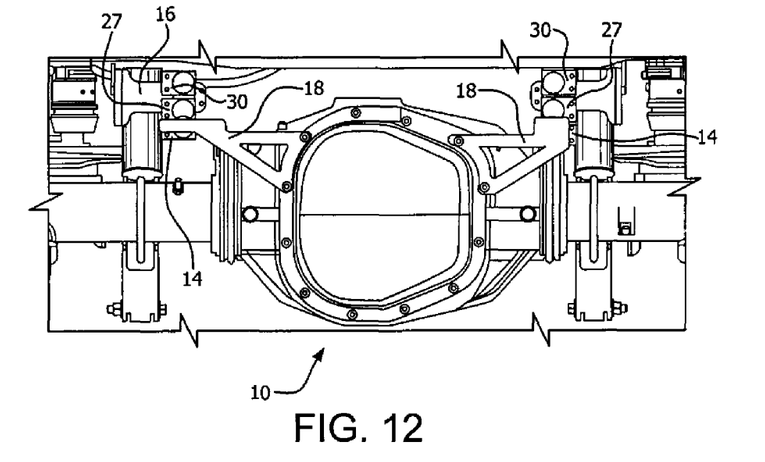
FIG. 12 is a rear side elevational view according to a fifth embodiment of the invention with a load on a vehicle.

Another embodiment of the invention is shown in FIG. 12 in which a vehicle load warning apparatus and range of payload indicator system 10 is depicted that is based on the combination of a multiplicity of proximity sensors 14. In this preferred embodiment, a first set of proximity sensors 14, a second set of proximity sensors 27, and a third set of proximity sensors 30, are mounted in a vertical alignment on each side of body 16 of the vehicle. As the cargo weight increases, the first set of proximity sensors 14 are activated as the suspension deflects and the first set of proximity sensors 14 come into alignment with brackets 18 in the manner previously described herein. At this intermediate state, a proximity sensor warning alerts the operator that the vehicle load has moved into a new payload stage as previously determined by the characteristics of the vehicle. If additional cargo weight is added to the vehicle, the second set of proximity sensors 27 come into alignment with bracket members 18 in the manner previously described herein as the suspension continues to deflect and the cargo weight achieves a second range of payload state, and similarly, as one skilled in the art can appreciate, as payload increases further the third set of proximity sensors 30 come within the nominal range of members 18, thereby warning the operator that vehicle has reached its greatest payload stage. According to another embodiment, it can be appreciated that one having ordinary skill in the art can adapt a fourth or more proximity sensors of the type herein described in successive vertical alignment with one with one another according to the method described in order to create additional intermediary alarms.

In a preferred embodiment, sensor 10 permits proximity sensors 14 to come into a detectable distance from brackets 18 for a period of time before triggering a signal. The signal is transmitted if and only if the detectable distance is maintained for at least as long as the predetermined time. In so doing, certain false positives due to, for example, a bumpy road, would not trigger the signals referred to herein.

In one embodiment of the instant invention, vehicle overload sensor 10 operates in the manner herein described regardless of whether the vehicle is in park, neutral, drive or reverse. In another embodiment of the instant invention, vehicle overload sensor 10 would only operate in the manner herein described when the vehicle is stationary (i.e. in park or neutral).

What is claimed is:

1. A vehicle overload warning apparatus comprising:
a proximity sensor mounted to the body of said vehicle;
a member attached at a first end to the axle housing suspended below said body of said vehicle in a vertical position below said sensor; and
a second end of said member being disposed with respect to said sensor (i) horizontally, so as to be disposed directly under said sensor; (ii) offset in a direction from front to back of said vehicle, so as to provide a clearance distance that is less than the distance of the nominal range of said sensor between said sensor and said member in the case in which said sensor moves downward as said vehicle is loaded; and (iii) vertically, in a position when said vehicle approaches becoming overloaded, with the result that in the case in which said sensor deflects downward until said member has become vertically aligned with said sensor whereby said clearance distance between said sensor is within the nominal range of said sensor thereby triggering said sensor, while said clearance distance being great enough so as to avoid contact between said sensor and said member.

2. The vehicle load warning apparatus of claim 1 wherein the mounting of said sensor to said body comprises a first plate to which said sensor is mounted at its first end and a second plate having a first end to which said second end of said first plate is mounted and having a second end mounted to said vehicle body whereby the mounting of said second end of said first plate to said first end of said second plate is adjustable.

3. The vehicle load warning apparatus of claim 1 further comprising an electrical signal being sent from said sensor in the case in which said sensor is within said nominal range of said member wherein said signal is electrically connected via a switch to an alarm.

4. The vehicle load warning apparatus of claim 1 further comprising an electrical signal being sent from said sensor in the case in which said sensor is within said nominal range of said member wherein said signal is electrically connected via a switch to a signal light.

5. The vehicle load warning apparatus of claim 3 wherein said switch is in an open position unless said vehicle is in a parked gear.

6. The vehicle load warning apparatus of claim 3 wherein said sensor is triggered only in the case in which said sensor remains within said nominal range of said member for at least one second.

7. The vehicle load warning apparatus of claim 1 in which said proximity sensor is an inductive proximity sensor.

8. The vehicle load warning apparatus of claim 7 in which said member is metal.

9. A vehicle load warning apparatus comprising:
a first proximity sensor mounted to the body of said vehicle;
a second proximity sensor mounted to said body at a position above said first sensor;
a member attached at a first end to the axle housing suspended below said body on the said vehicle in a vertical position below said first sensor; and
a second end of said member being disposed with respect to said first sensor (i) horizontally, so as to be disposed directly under said first sensor; (ii) offset in a direction from front to back of said vehicle, so as to provide clearance between said first sensor and said second sensor in the case in which said sensors move downward as the vehicle is loaded; and (iii) vertically, in a position when said vehicle is loaded to a maximum weight, said first sensor and said second sensor deflect with said body until said second end of said member has become vertically aligned, first, with said first sensor whereby said clearance distance between said first sensor and said member is within the nominal range of said first sensor thereby triggering said first sensor, while said clearance distance being great enough so as not to permit contact between said first sensor and said member, and second, with said second sensor whereby said clearance distance between said second sensor and said member is within the nominal range of said second sensor thereby triggering said second sensor, while said clearance distance being great enough so as not to permit contact between said second sensor and said member.

10. The vehicle load warning apparatus of claim 9 wherein each of said sensors is adjustably mounted to said body.

11. The vehicle load warning apparatus of claim 9 further comprising:
a first electrical signal being sent from said first sensor in the case in which said first sensor is within said nominal range of said member wherein said first signal is electrically connected via a switch to a first warning signal apparatus; and
a second electrical signal being sent from said second sensor in the case in which said second sensor is within said nominal range of said member wherein said second signal is electrically connected via a switch to a second warning signal apparatus.

12. The vehicle load warning apparatus of claim 11 wherein said switch is in an open position unless said vehicle is in a parked gear.

13. The vehicle load warning apparatus of claim 9 wherein said first sensor is triggered only in the case in which said sensor remains within said nominal range of said member for at least one second and wherein said second sensor is triggered only in the case in which said sensor remains within said nominal range of said member for at least one second.

14. The vehicle load warning apparatus of claim 9 in which each of said proximity sensors is an inductive proximity sensor.

15. The vehicle load warning apparatus of claim 14 in which said member is metal.

16. A vehicle load warning apparatus comprising:
a first proximity sensor mounted to one side of the body of said vehicle;
a first member attached on said one side at a first end to the rear axle housing suspended below said body of said vehicle on a horizontal plane above the plane of the axle running through said axle housing;
a second proximity sensor mounted to the side of said vehicle opposite to said one side of said body of said vehicle;
a second member attached on said side opposite to said one side at a first end to said rear axle housing on said horizontal plane when said vehicle becomes overloaded in an unbalanced manner such that the center of gravity of the load deflects toward the driver said one side of said vehicle, said first sensor moves downward with the result that said driver side member becomes vertically aligned with and within the nominal range of said first sensor without contact between said first sensor and said driver side member, thereby triggering said first sensor, and, second, in the case in which said vehicle becomes overloaded in an unbalanced manner such that the center of gravity of the load deflects toward said other side of said vehicle, said second sensor moves downward with the result that said other side member becomes vertically aligned with and within the nominal range of said second sensor without contact between said second sensor and said passenger side member, thereby triggering said second sensor.

17. The vehicle load warning apparatus of claim 16 further comprising an electrical signal being sent from said first sensor in the case in which said sensor is within said nominal range of said one side member wherein said signal is electrically connected via a first switch to a first warning signal apparatus indicating overload unbalanced toward said side of said vehicle and an electrical signal being sent from said second sensor in the case in which said sensor is within said nominal range of said other side member wherein said signal is electrically connected via a second switch to a second warning signal apparatus indicating overload unbalanced toward other side of said vehicle.

18. The vehicle load warning apparatus of claim 17 wherein each of said first switch and said second switch is in an open position unless said vehicle is in a parked gear.

19. The vehicle load warning apparatus of claim 16 wherein said first sensor is triggered only in the case in which said sensor remains within said nominal range of said side member for at least one second and said second sensor is triggered only in the case in which said sensor remains within said nominal range of said other side member for at least one second.

20. The vehicle load warning apparatus of claim 16 in which each of said sensors is an inductive proximity sensor.

21. The vehicle load warning apparatus of claim 20 in which each of said members is metal.

22. The vehicle load warning apparatus of claim 17 in which each of said first warning signal apparatus and said second warning signal apparatus is selected from the group consisting of electric audible alarms, electric signal lights, electronic gauges, and electronic meters.

23. A vehicle overload warning apparatus comprising:
a proximity sensor mounted to the body of the said vehicle in a horizontal position relative to the axle housing suspended below said body of said vehicle;
a member attached to said axle housing in a horizontal position relative to and directly below said sensor so that, in the case in which said vehicle approaches becoming overloaded said sensor deflects downward with the result that the distance between said sensor and said member is within the nominal range of said sensor, thereby triggering said sensor; and
a bump stop attached to said body of said vehicle having a width great enough so as to contact said axle housing in the case in which said body and said sensor deflect downward to avoid contact between said sensor and said member.

24. The vehicle load warning apparatus of claim 23 wherein the mounting of said sensor to said body comprises a first plate to which said sensor is mounted at its first end and a second plate having a first end to which said second end of said first plate is mounted and having a second end mounted to said body of said vehicle whereby the mounting of said second end of said first plate to said first end of said second plate is adjustable.

25. The vehicle load warning apparatus of claim 23 further comprising an electrical signal being sent from said sensor in the case in which said sensor is within said nominal range of said member wherein said signal is electrically connected via a switch to a warning signal apparatus.

26. The vehicle load warning apparatus of claim 25 wherein said switch is in an open position unless said vehicle is in a parked gear.

27. The vehicle load warning apparatus of claim 25 wherein said sensor is triggered only in the case in which said sensor remains within said nominal range of said member for at least one second.

28. The vehicle load warning apparatus of claim 23 in which said proximity sensor is an inductive proximity sensor.

29. The vehicle load warning apparatus of claim 28 in which said member is metal.

30. The vehicle load warning apparatus of claim 25 in which said warning signal apparatus is selected from the group consisting of electric audible alarms, electric signal lights, electronic gauges, and electronic meters.

31. A vehicle load warning apparatus and range of vehicle body payload indicator system comprising:
a first proximity sensor mounted to the body of said vehicle;
a second proximity sensor mounted to said body at a position above said first sensor;
a member attached at a first end to the axle housing suspended below said body of said vehicle in a vertical position below said first sensor; and
a second end of said member being disposed with respect to said first sensor (i) horizontally, so as to be disposed directly under said first sensor; (ii) offset in a direction from front to back of said vehicle, so as to provide clearance between said first sensor and said second sensor in the case in which said sensors move downward as said vehicle is loaded; and (iii) vertically, in a position when said body of said vehicle is loaded to a maximum weight, said first sensor and said second sensor deflect with said body until said second end of said member has become vertically aligned, first, with said first sensor whereby said clearance distance between said first sensor and said member is within the nominal range of said first sensor thereby triggering said first sensor, said clearance distance being great enough so as not to permit contact between said first sensor and said member, and second, with said second sensor whereby said clearance distance between said second sensor and said member is within the nominal range of said second sensor thereby triggering said second sensor, said clearance distance being great enough so as not to permit contact between said second sensor and said member whereby a predetermined first vehicle body payload range is indicated in the case in which said first sensor has been triggered but said second sensor has not been triggered, and whereby a predetermined second vehicle body payload range that is greater than said first payload range is indicated in the case in which said second sensor has been triggered.

32. The vehicle load warning apparatus and range of vehicle body payload indicator system of claim 31 further comprising:
a third proximity sensor mounted to said body at a position above said second sensor whereby a predetermined third payload range that is greater than said second vehicle body payload range is indicated in the case in which said third sensor has been triggered.

33. The vehicle load warning apparatus and range of vehicle body payload indicator system of claim 32 wherein each of said sensors is adjustably mounted to said body.

34. The vehicle load warning apparatus and range of vehicle body payload indicator system of claim 31 further comprising:
- a first electrical signal being sent from said first sensor in the case in which said first sensor is within said nominal range of said member wherein said first signal is electrically connected via a switch to a first warning signal apparatus that indicates that said first predetermined vehicle body payload range has been reached; and
- a second electrical signal being sent from said second sensor in the case in which said second sensor is within said nominal range of said member wherein said second signal is electrically connected via a switch to a second warning signal apparatus that indicates that said second predetermined vehicle body payload range has been reached.

35. The vehicle load warning apparatus and range of vehicle body payload indicator system of claim 32 further comprising:
- a first electrical signal being sent from said first sensor in the case in which said first sensor is within said nominal range of said member wherein said first signal is electrically connected via a switch to a first warning signal apparatus that indicates that said first predetermined vehicle body payload range has been reached;
- a second electrical signal being sent from said second sensor in the case in which said second sensor is within said nominal range of said member wherein said second signal is electrically connected via a switch to a second warning signal apparatus that indicates that said second predetermined vehicle body payload range has been reached; and
- a third electrical signal being sent from said third sensor in the case in which said third sensor is within said nominal range of said member wherein said third signal is electrically connected via a switch to a third warning signal apparatus that indicates that said third predetermined vehicle body payload range has been reached.

36. The vehicle load warning apparatus and range of vehicle body payload indicator system of claim 35 further wherein said switch is in an open position unless said vehicle is in a parked gear.

37. The vehicle load warning apparatus and range of vehicle body payload indicator system of claim 35 wherein said first sensor is triggered only in the case in which said sensor remains within said nominal range of said member for at least one and wherein said second sensor is triggered only in the case in which said sensor remains within said nominal range of said member for at least one second and said third sensor is triggered only in the case in which said sensor remains within the nominal range of said member for at least one second.

38. The indicator vehicle load warning apparatus and range of vehicle body payload system of claim 32 in which each of said proximity sensors is an inductive proximity sensor.

39. The vehicle load warning apparatus and range of vehicle body payload indicator system of claim 38 in which said member is metal.

40. The vehicle load warning apparatus and range of vehicle body payload indicator system of claim 34 in which each of said first warning signal apparatus and said second warning signal apparatus is selected from the group consisting of electric audible alarms, electric signal lights, electronic gauges, and electronic meters.

41. The vehicle load warning apparatus and range of vehicle body payload indicator system of claim 35 in which each of said first warning signal apparatus, said second warning signal apparatus, and said third warning signal apparatus is selected from the group consisting of electric audible alarms, electric signal lights, electronic gauges, and electronic meters.

42. A vehicle load warning apparatus and range of vehicle body payload indicator system comprising:
- a multiplicity of proximity sensors mounted directly one above the other to the body of said vehicle;
- a member attached at a first end to the axle housing suspended below said body of said vehicle in a vertical position below the lowest mounted of said multiplicity of sensors; and
- a second end of said member being disposed with respect to said multiplicity of sensors (i) horizontally, so as to be disposed directly under said lowest mounted sensor; (ii) offset in a direction from front to back of said vehicle, so as to provide clearance between each of said sensors in the case in which said sensors move downward said vehicle is loaded; and (iii) vertically, in a position when said vehicle is loaded said sensors deflect with said body until said second end of said member has become vertically aligned, first, with said lowest mounted sensor whereby said clearance distance between said first sensor and said member is within the nominal range of said first sensor thereby triggering said first sensor, said clearance distance being great enough so as not to permit contact between said first sensor and said member, and thereafter with each of said sensors in turn, whereby said clearance distance between each of said sensors and said member is within the nominal range of said sensor thereby triggering said sensor, said clearance distance being great enough so as not to permit contact between any of said sensors and said member whereby a predetermined first vehicle body payload range is indicated in the case in which said lowest mounted sensor has been triggered but said second sensor has not been triggered, and in turn whereby predetermined vehicle body payload ranges that are greater than said predetermined first vehicle body payload range are in turn indicated in the case in which each of said sensors in turn has been triggered.

\* \* \* \* \*